US012729726B2

(12) United States Patent
Hur

(10) Patent No.: US 12,729,726 B2
(45) Date of Patent: Sep. 8, 2026

(54) BRAKE DUST COLLECTOR ASSEMBLY

(71) Applicant: HL MANDO CORPORATION, Pyeongtaek-si (KR)

(72) Inventor: Jaejin Hur, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 329 days.

(21) Appl. No.: 18/236,594

(22) Filed: Aug. 22, 2023

(65) Prior Publication Data

US 2024/0229876 A1 Jul. 11, 2024

(30) Foreign Application Priority Data

Jan. 9, 2023 (KR) ........................ 10-2023-0002907

(51) Int. Cl.
*F16D 65/00* (2006.01)
*B01D 46/00* (2022.01)
*F16D 55/227* (2006.01)

(52) U.S. Cl.
CPC ..... *F16D 65/0031* (2013.01); *B01D 46/0005* (2013.01); *F16D 55/227* (2013.01)

(58) Field of Classification Search
CPC ............... F16D 65/0031; F16D 55/226; F16D 55/2265; F16D 55/22655; F16D 55/227; B01D 46/0005
See application file for complete search history.

(56) References Cited

U.S. PATENT DOCUMENTS 6,062,349 A * 5/2000 Boisseau ............... F16D 65/095 188/73.45
2006/0054430 A1* 3/2006 Maehara ............. F16D 65/0977 188/234
2010/0065387 A1 3/2010 Tsiberidis
2010/0133050 A1 6/2010 Arbesman et al.
2014/0054120 A1 2/2014 Hummel et al.
(Continued)

FOREIGN PATENT DOCUMENTS

DE 102020111811 A1 11/2021
DE 102020126890 A1 4/2022
(Continued)

OTHER PUBLICATIONS

KR20220163108 translation (Year: 2022).*
(Continued)

*Primary Examiner* — Timothy Hannon
(74) *Attorney, Agent, or Firm* — Hauptman Ham, LLP

(57) ABSTRACT

Disclosed herein is a brake dust collector. The brake dust collector in accordance with the present embodiment may include: a pad module including a pair of brake pads that are respectively disposed on both sides of a disc rotating together with a wheel and are in close contact with or separated from the disc according to a forward and backward movement of a piston; a housing provided to cover a part of the disc by forming a pad module seat provided between a leading portion and a trailing portion and coupled to the pad module, and a filter module seat on an inner side of each of the leading portion and the trailing portion; and a filter module fixed to each of the filter module seats by a fastening member that penetrates and fastens from one side to the other side of the housing.

19 Claims, 7 Drawing Sheets

(56) References Cited

U.S. PATENT DOCUMENTS

| | | | | |
|---|---|---|---|---|
| 2018/0031059 | A1 | 2/2018 | Gelb | |
| 2020/0132139 | A1* | 4/2020 | Jedele | F16D 65/0068 |
| 2024/0159281 | A1* | 5/2024 | Uno | F16D 65/0031 |

FOREIGN PATENT DOCUMENTS

| | | | | | |
|---|---|---|---|---|---|
| EP | 4 105 511 | A1 | | 12/2022 | |
| JP | 7043353 | B2 | | 3/2022 | |
| KR | 10-2010-0138100 | A | | 12/2010 | |
| KR | 10-2018-0060338 | A | | 6/2018 | |
| KR | 10-2018-0060512 | A | | 6/2018 | |
| KR | 10-2021-0078491 | A | | 6/2021 | |
| KR | 10-2022-0094325 | A | | 7/2022 | |
| KR | 10-2022-0163108 | A | | 12/2022 | |
| KR | 10-2022-0166195 | A | | 12/2022 | |
| KR | 20220163108 | A | * | 12/2022 | F16D 55/226 |
| WO | WO-2022219849 | A1 | * | 10/2022 | F16D 55/226 |
| WO | WO-2022262912 | A1 | * | 12/2022 | F16D 65/0031 |

OTHER PUBLICATIONS

WO2022262812 translation (Year: 2022).*
Extended European Search Report dated Jan. 18, 2024 in connection with the counterpart European Patent Application No. EP23190525.8, 6 pages.
Communication of a notice of opposition dated Sep. 16, 2025 for corresponding European Patent Application No. 23190525.8 (14 pages).
Office Action issued on Apr. 16, 2026, for corresponding Korean Patent Application No. 10-2023-0002907, with its English Machine translation, 14 pages.

* cited by examiner

BRAKE DUST COLLECTOR ASSEMBLY

CROSS-REFERENCE TO RELATED APPLICATION

This application claims the benefit of Korean Patent Application No. 10-2023-0002907, filed on Jan. 9, 2023 in the Korean Intellectual Property Office, the disclosure of which is incorporated herein by reference.

BACKGROUND

1. Field

Embodiments of the present disclosure relate to a brake dust collector, and more particularly, to a brake dust collector for collecting dust caused by friction between a brake pad and a disc during a braking operation.

2. Description of the Related Art

As the importance of environmental protection is emphasized, environmental friendliness has become a big issue in the automobile industry, and regulations on pollutants emitted from automobiles are also being continuously strengthened Meanwhile, pollutants emitted from vehicles may be largely classified into pollutants emitted from an exhaust system and pollutants emitted from a non-exhaust system. The pollutants emitted from the exhaust system are pollutants contained in exhaust gas, which is generated when an engine of a vehicle is driven, and are already subject to regulations, while the pollutants emitted from the non-exhaust system are expected to be subject to corresponding regulations.

Specifically, among the pollutants emitted from the non-exhaust system, dust generated due to abrasion caused by a frictional force between a brake pad and a disc during vehicle braking contains a large amount of harmful substances, so that a method for minimizing the dust is required in line with the fact that regulations on harmful dust and fine dust are gradually tightening.

In addition, since a fixed-type caliper brake including a monoblock caliper usually provides relatively stable braking power even in high-speed repetition, vehicle models to which the fixed-type caliper brake is applied are relatively high-performance vehicles and a large amount of dust is generated between discs and brake pads, and thus a method of reducing the dust is required all the more urgently.

Meanwhile, in order to meet the requirement, the conventional dust collector is provided as a separate device for dust collection on one side of a caliper housing, which reduces aesthetics and also reduces maintainability because the device body should be removed from the vehicle to clean or replace the filter.

SUMMARY

Therefore, it is an aspect of the present disclosure to provide a brake dust collector capable of effectively collecting dust that is generated by friction between a disc and a brake pad and discharged to the outside of a housing.

It is another aspect of the present disclosure to provide a brake dust collector capable of improving dust collection efficiency by filter modules provided in a leading portion and a trailing portion, respectively.

It is still another aspect of the present disclosure to provide a brake dust collector capable of facilitating management of a filter module by enabling the filter module to be cleansed by washing liquid and the like even in a state where the filter module is mounted on a housing.

It is yet another aspect of the present disclosure to provide a brake dust collector capable of collecting dust through a tangential air flow generated by rotation of a disc without a separate flow control element for dust induction.

It is yet another aspect of the present disclosure to provide a brake dust collector capable of preventing deterioration in aesthetics by omitting a device for dust collection provided separately from a housing.

It is yet another aspect of the present disclosure to provide a brake dust collector capable of minimizing stiffness degradation of a housing caused by a filter module inserted into the housing.

Additional aspects of the disclosure will be set forth in part in the description which follows and, in part, will be obvious from the description, or may be learned by practice of the disclosure.

In accordance with one embodiment of the present disclosure, a brake dust collector includes: a pad module including a pair of brake pads that are respectively disposed on both sides of a disc rotating together with a wheel and are in close contact with or separated from the disc according to a forward and backward movement of a piston; a housing provided to cover a part of the disc by forming a pad module seat provided between a leading portion and a trailing portion and to which the pad module is coupled, and filter module seats at inner sides of the leading portion and the trailing portion, respectively; and a filter module fixed to each of the filter module seats by a fastening member that penetrates and fastens from one side to the other side of the housing.

The pad module may further include: pad springs provided between both ends of the brake pad and the pad module seat; a shim pad provided between the brake pad and the piston; and guide pins provided in guide holes formed at both sides of an upper portion of the brake pad and configured to guide the forward and backward movement of the brake pad.

Each of the pad springs may include: a guide pin locking portion provided in an upper center part and locked to a center part of the guide pin; a housing locking portion provided at an upper end and locked to the housing; and pad supports provided on both sides of a lower end of the brake pad and configured to support each side of the lower end of the brake pad.

The housing may further include: pad module exposure portions provided on both ends of the pad module seat to penetrate upwards, respectively; and a pad spring support provided at the pad module exposure portion and configured to seat the housing locking portion.

The piston may be installed in a piston insertion portion provided on the pad module seat, and the shim pad may be fastened to the brake pad.

The guide pin may include a fixing member fastening hole provided at a head side; and a fixing member inserted into the fixing member fastening hole to prevent the guide pin from being separated from the housing and the brake pad, and may be coupled to a guide pin fastening hole provided in the pad module seat and the guide hole.

The housing may further include an exposure groove provided at an end of each of the leading portion and the trailing portion so that one end of the filter module is partially exposed.

The filter module may be fixed to the filter module seat with an end of the pad module being spaced at a predetermined interval from the pad spring or may be fixed to the filter module seat with an end of the pad module being supported by the pad spring.

The filter module may include fastening member through holes, which are penetrated by the fastening members at both ends, and may be fixed to the pad module seat by the fastening member fastening through a fastening member fastening hole provided on the pad module seat and the fastening member through hole.

The fastening member may be provided with a bolt penetrating the fastening member fastening hole on one side and a nut fastened to the bolt exposed to the fastening member fastening hole on the other side.

The filter module may include a filter made of metal with corrosion resistance and heat resistance.

The housing may be provided as a monoblock further including at least one or more heat dissipation holes that are provided as a heat exhaust passage and a fluid flow passage, respectively, in the leading portion and the trailing portion.

In accordance with another embodiment of the present disclosure, a brake dust collector includes: a pad module including a pair of brake pads that are respectively disposed on both sides of a disc rotating together with a wheel and are in close contact with or separated from the disc according to a forward and backward movement of a piston; a housing provided to cover a part of the disc by forming a pad module seat provided between a leading portion and a trailing portion and to which the pad module is coupled, and a filter module seat at an inner side of the trailing portion; and a filter module fixed to the filter module seat by a fastening member penetrating and fastening from one side to the other side of the housing through a fastening member fastening hole provided on the filter module seat.

The housing may further include an exposure groove provided at an end of the trailing portion so that one end of the filter module is partially exposed.

The housing may be provided as a monoblock further including at least one or more heat dissipation holes that are provided as a heat exhaust passage and a fluid flow passage on the filter module seat.

The filter module may include a filter made of metal with corrosion resistance and heat resistance.

The fastening member may be provided with a bolt penetrating the fastening member fastening hole on one side, and a nut fastened to the bolt exposed to the fastening member fastening hole on the other side.

The filter module may be fixed to the filter module seat at a predetermined interval from the pad module.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings may omit the illustration of parts not related to the description in order to clarify the present invention, and slightly exaggerate the size of the components to help understanding.

Figure 1:
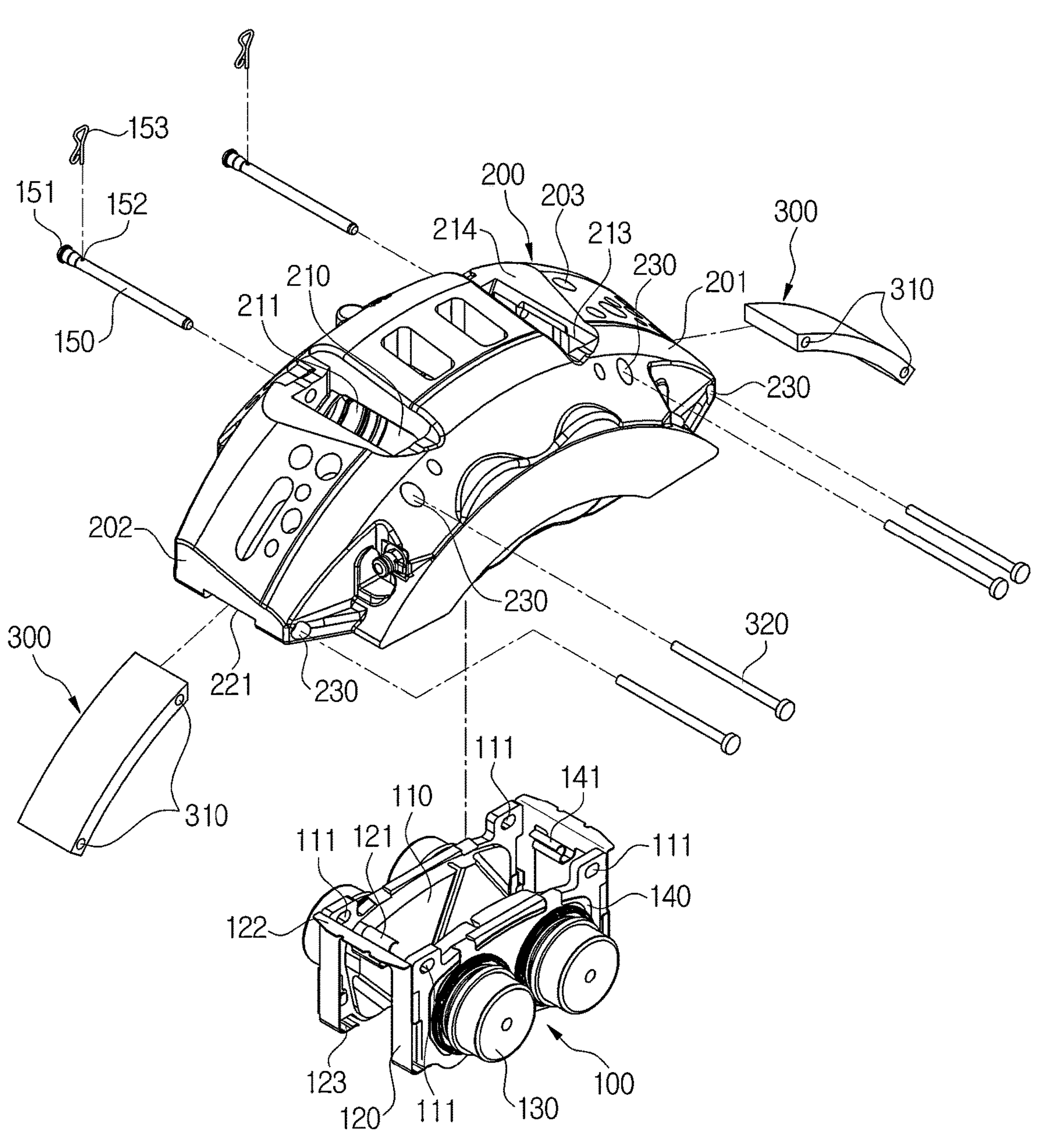
FIG. 1 is an exploded perspective view of a brake dust collector in accordance with one embodiment of the present disclosure.
Figure 2:
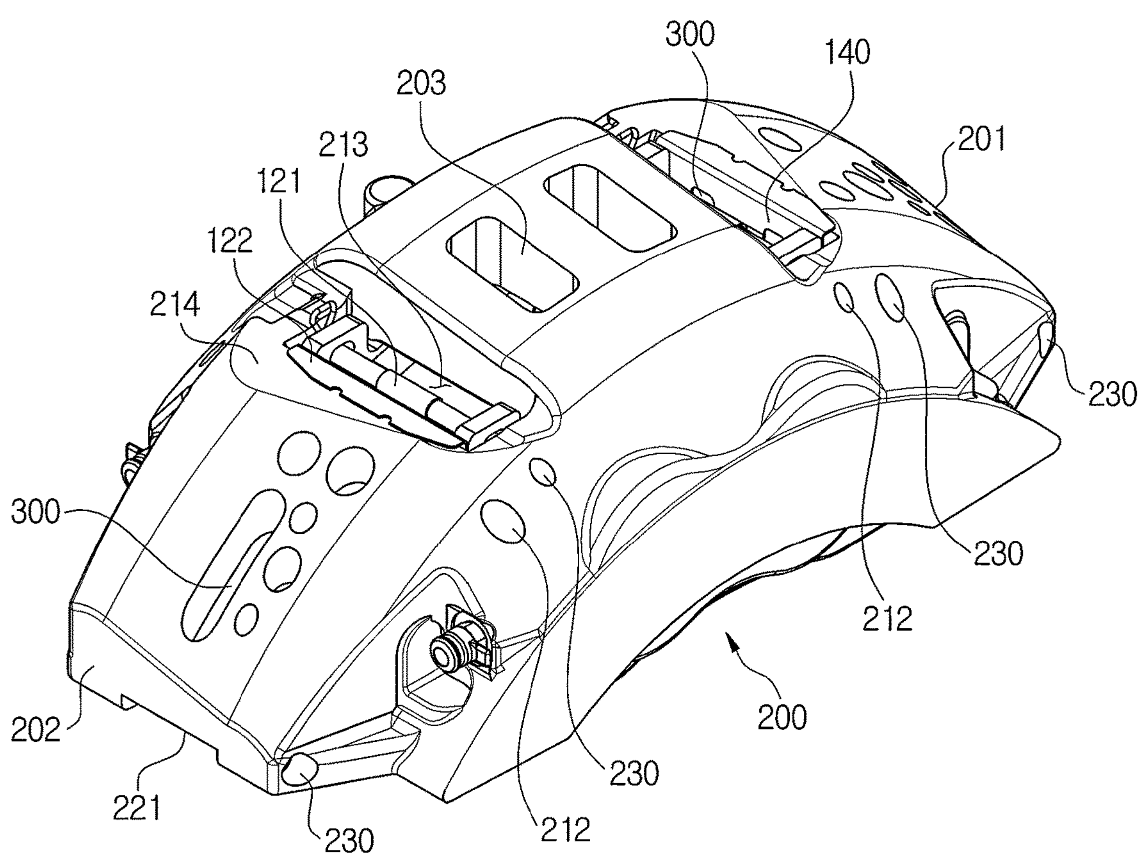
FIG. 2 is a perspective view of the brake dust collector in accordance with one embodiment of the present disclosure.
Figure 3:
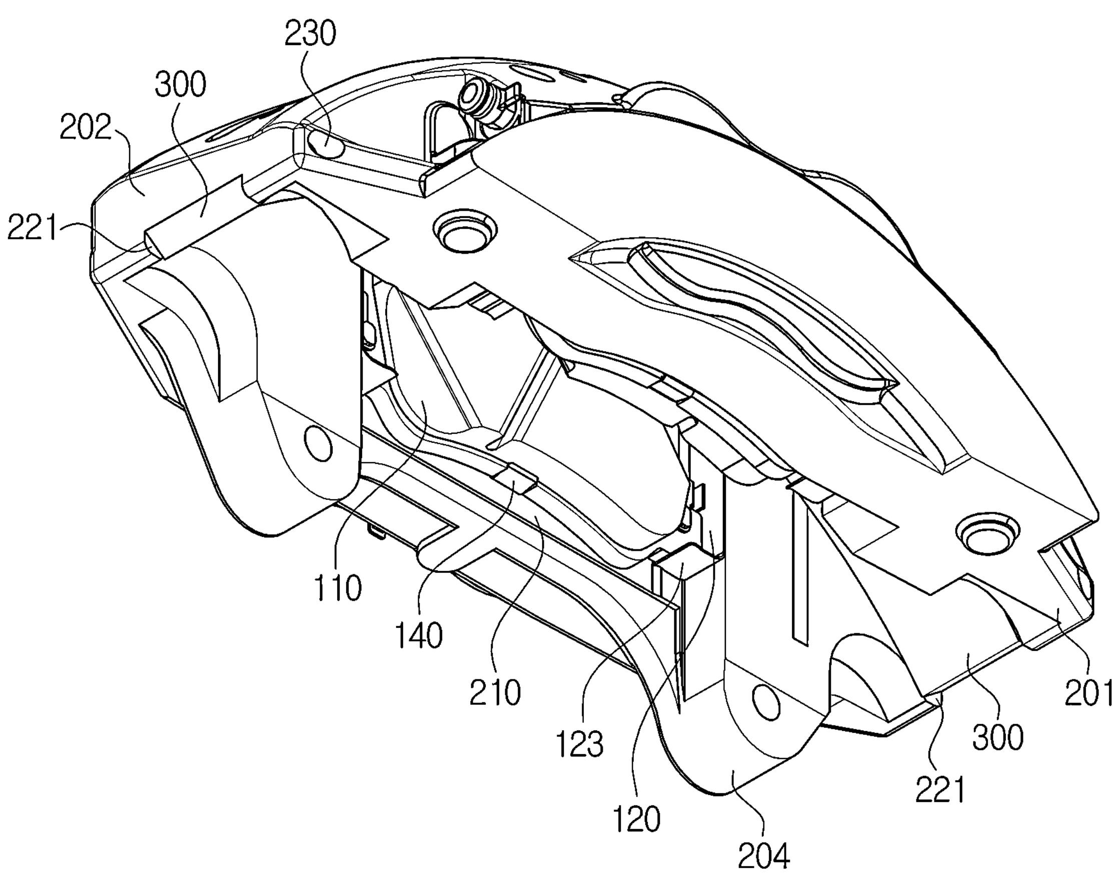
FIG. 3 is a bottom perspective view illustrating the brake dust collector in accordance with one embodiment of the present disclosure.
Figure 4:
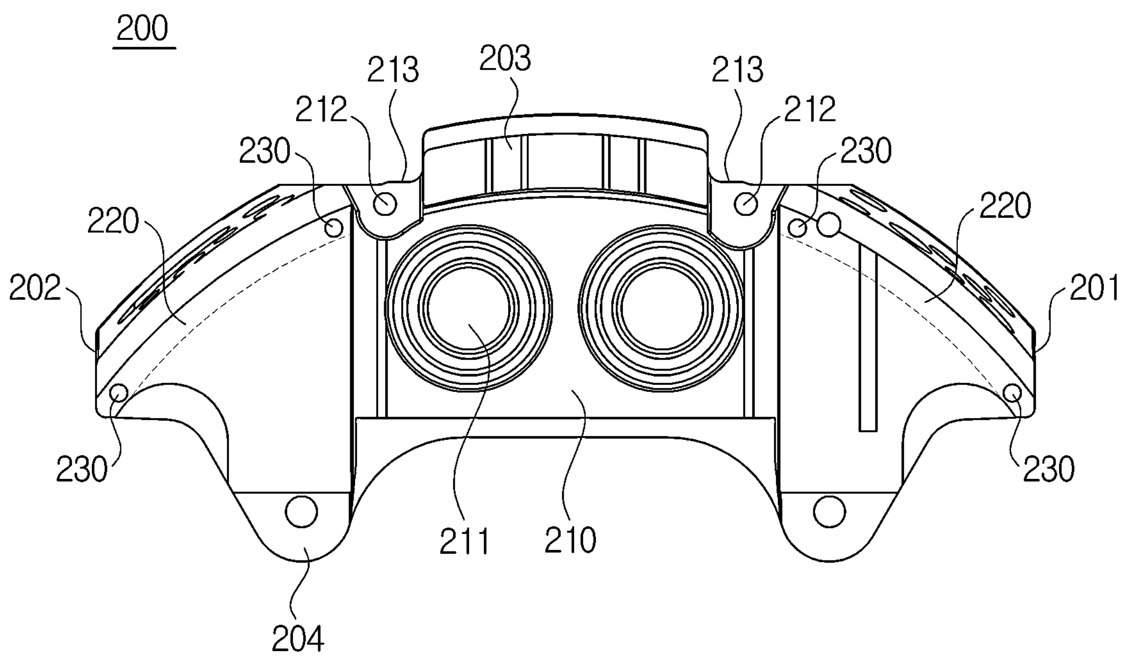
FIG. 4 is a sectional view illustrating a housing cross section of the brake dust collector in accordance with one embodiment of the present disclosure.
Figure 5:
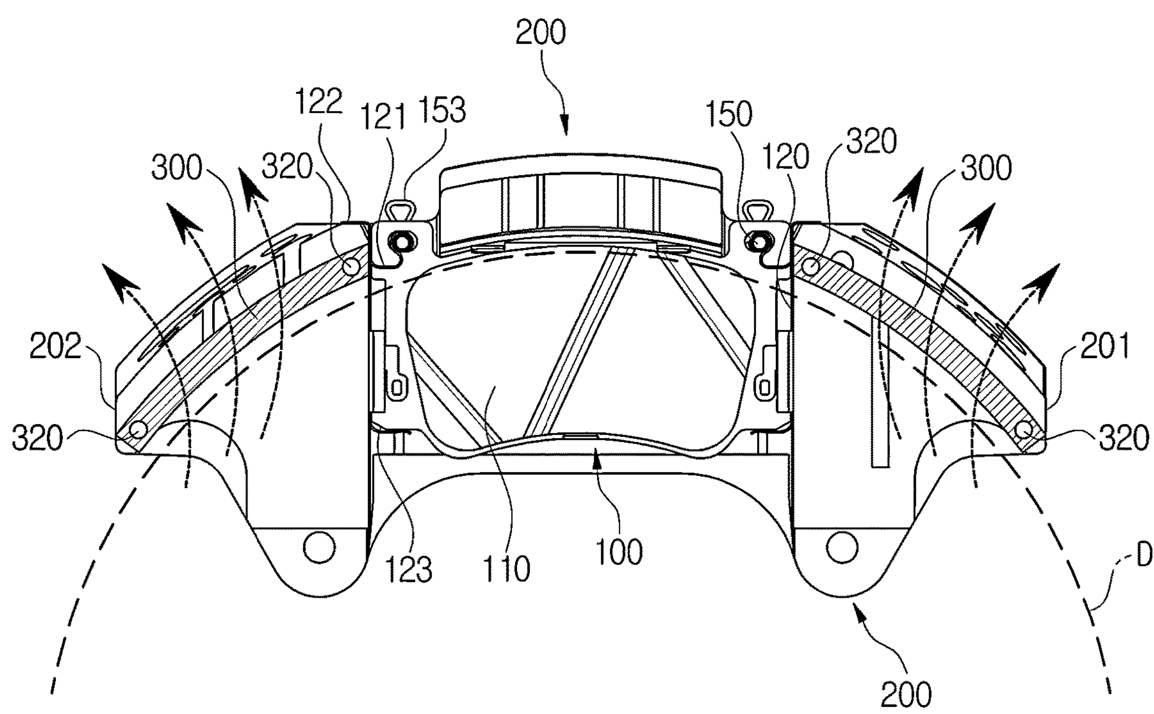
FIG. 5 is a sectional view of the brake dust collector in accordance with one embodiment of the present disclosure.
Figure 6A:
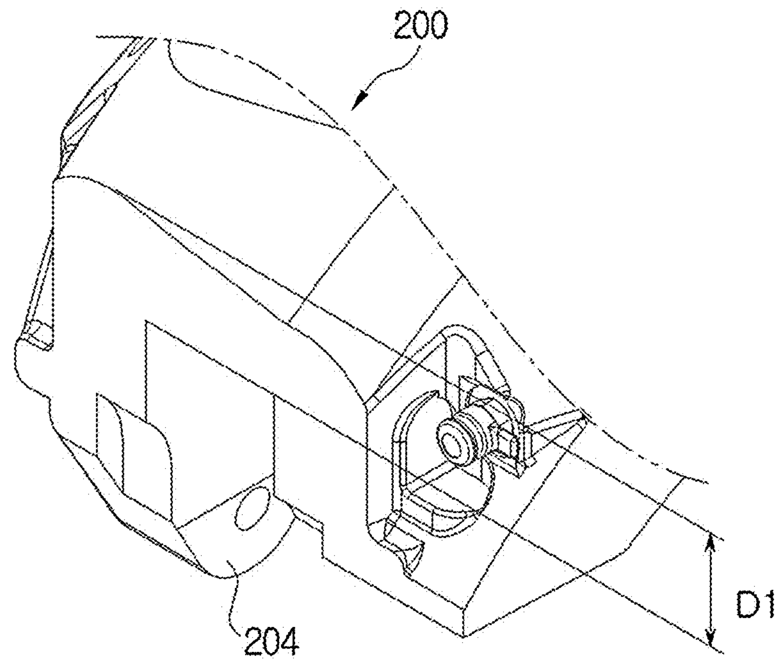
FIGS. 6A and 6B are sectional views illustrating a thickness of a conventional brake housing in which a filter module is omitted, and a thickness of a housing with a filter module in the brake dust collector in accordance with one embodiment of the present disclosure.
Figure 6B:
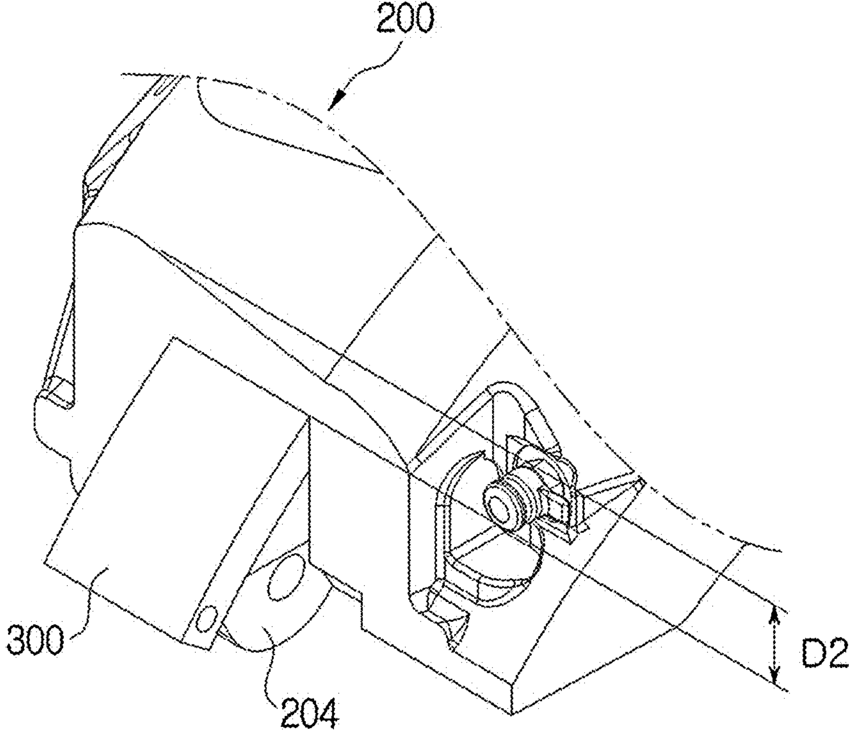

FIG. 1 is an exploded perspective view of a brake dust collector in accordance with one embodiment of the present disclosure, and FIGS. 2 and 3 are perspective views each illustrating a state where the brake dust collector in accordance with one embodiment of the present disclosure is coupled. In addition, FIG. 4 is a sectional view illustrating a housing cross section of the brake dust collector in accordance with one embodiment of the present disclosure, and FIG. 5 is a sectional view illustrating a cross section of the brake dust collector in accordance with one embodiment of the present disclosure. In addition, FIGS. 6A and 6B are sectional views illustrating a thickness of a conventional brake housing in which a filter module is omitted, and a thickness of a housing with a filter module in the brake dust collector in accordance with one embodiment of the present disclosure.

Referring to FIGS. 1 to 6, a brake dust collector in accordance with one embodiment of the present disclosure includes a pad module 100, a housing 200 in which the pad module 100 is embedded, and a filter module 300 coupled to each of a leading portion 201 and a trailing portion 202 of the housing 200.

More specifically, the pad module 100 includes a pair of brake pads 110 that are respectively disposed on both sides of a disc D rotating together with a wheel and are in close contact with or separated from the disc D according to a forward and backward movement of a piston 130, a pad spring 120 provided between both ends of the brake pads 110 and the housing 200 to facilitate the forward and backward movement of the brake pads 110, a shim pad 140 provided between the brake pad 110 and the piston 130 to prevent noise and vibration which occur during the forward and backward movement of the piston 130, and a guide pin 150 configured to guide the forward and backward movement of the brake pad 110.

The brake pad 110 includes a backplate provided on a side of the piston 130 and a friction layer provided to touch the disc D. Herein, the backplate and the friction layer may be integrally formed. In addition, the brake pad 110 includes a guide hole 111 penetrated by the guide pin 150 on both sides of an upper portion.

The pad spring 120, which is a leaf spring, includes a guide pin locking portion 121 provided in an upper center part and locked to a center part of the guide pin 150, a housing locking portion 122 provided at an upper end and locked to the housing 200, and a pad support 123 provided at a lower end and configured to support a lower end of the brake pad 110, and facilitates the forward and backward movement of the brake pad 110 by preventing vibration during the forward and backward movement of the brake pad 110. Herein, the guide pin locking portion 121, the housing locking portion 122, and the pad support 123 may each be provided by bending a corresponding part of the leaf spring.

As described above, the piston 130 is a device of advancing and retreating the brake pad 110, and although FIG. 1 illustrates that the piston 130 is coupled to the brake pad 110, the piston 130 may be installed into a piston insertion portion 211 in advance, which is provided at an inner side of the housing 200, when the pad module 100 and the housing 200 are coupled. In addition, various methods such as a hydraulic method, a mechanical method, and the like may be applied to the piston 130.

The shim pad 140 is a plate for preventing noise, vibration, and the like, which are caused by the forward and backward movement of the brake pad 110, and is fastened to the brake pad 110 to be provided between the brake pad 110 and the piston 130. To this end, the shim pad 140 includes at least one bent portion that can be fixed to the brake pads 110 at an upper portion and a lower portion, respectively. Accordingly, when the pad module 100 is coupled to a pad module seat 210, the shim pad 140 is located at the side of the piston 130 which is inserted into the piston insertion portion 211.

The guide pin 150 includes a fixing member fastening hole 152 provided at a head 151 and a fixing member 153 such as a fixing pin and the like, which is inserted into the fixing member fastening hole 152 and prevents the guide pin 150 from being separated from the brake pad 110 and the housing 200.

Meanwhile, as illustrated in FIG. 4, the housing 200 includes a plurality of heat dissipation holes 203 provided all over the surface, which includes the leading portion 201 and the trailing portion 202, as a fluid flow passage, which exhausts heat caused by friction between the brake pads 110 and the disc D to the outside of the housing 200 and induces a fluid flow generated according to rotation of the disc D to the filter module 300, and a housing fastening portion 204 provided at one side of the housing 200 to fasten the housing 200 to a car body and the like.

Accordingly, the brake dust collector in accordance with the present embodiment may collect dust through a tangential air flow generated by rotation of a disc without a separate flow control element for dust induction.

More specifically, the housing 200 further includes the pad module seat 210 provided between the leading portion 201 and the trailing portion 202 to enable the pad module 100 to be inserted into the housing 200, filter module seats 220 formed to extend from both sides of an upper portion of the pad module seat 210 toward the leading portion 201 and the trailing portion 202, and fastening member fastening holes 230 provided at both ends of each of the filter module seats 220.

In addition, the housing 200 may be provided as a monoblock which is formed as an integral type to improve marketability through design.

The pad module seat 210 includes a piston insertion portion 211 provided on the pad module seat 210 and in which the piston 130 is inserted and installed, a guide pin fastening hole 212 provided so that the guide pin 150 may be penetrated and fastened from one side to the other side of the housing 200, a pad module exposure portion 213 formed to penetrate from an upper side to a lower side at both ends of the pad module seat 210; and a pad spring support 214 provided at the pad module exposure portion 213 to enable the housing locking portion 122 to be supported.

Herein, the guide pin fastening hole 212 may be formed in the pad module exposure portion 213 to enable the guide pin 150, which penetrates the guide pin fastening hole 212 and the guide hole 111 through the pad module exposure portion 213, to be identified at the upper side of the housing 200.

The filter module seat 220 has an overall arc shape and is formed to extend from one end of each of the leading portion 201 and the trailing portion 202 to the pad module exposure portion 213. In addition, as illustrated in FIG. 3, the filter module seat 220 includes an exposure groove 221 provided at one end of each of the leading portion 201 and the trailing portion 202 to facilitate mounting of the pad module 100 and checking whether the pad module 100 is mounted.

The fastening member fastening hole 230 is formed to penetrate from one side to the other side of the housing 200 at both ends of the filter module seat 220 so that the filter module 300 is fixed to the filter module seat 220. Herein, the fastening member fastening hole 230 may be provided as a hole to which processing such as tapping for fastening a bolt or the like, which may cause a decrease in stiffness of the housing 200, is not applied.

Meanwhile, the filter module 300 is a filter that collects dust generated by friction between the disc D and the brake pad 110, and maintains its shape even against high-pressured washing liquid flowing through the heat dissipation hole 203 for cleaning, and may be provided using a metal material with excellent corrosion resistance and heat resistance.

Accordingly, the brake dust collector in accordance with the present embodiment may enable the filter module 300 to be cleansed by washing liquid and the like even in a state in which the filter module 300 is mounted on the housing 200.

In addition, the filter module 300 includes, when being coupled to the filter module seat 220, a fastening member through hole 310 provided at a position corresponding to the fastening member fastening hole 230, and a fastening member 320 that fixes the filter module 300 from the housing 200.

Herein, the fastening member 320 may be provided with a bolt penetrating the fastening member fastening hole 230 on one side and a nut fastened to the bolt exposed on the fastening member fastening hole 230 on the other side, and thus may serve as a fastening member of the housing 200 and the filter module 300 and a stiffness reinforcing member of the housing 200, and various other means may be applied.

Accordingly, the brake dust collector in accordance with one embodiment of the present disclosure may minimize stiffness degradation of the housing 200, which occurs since a thickness D2 of the housing 200 due to the filter module 300 as illustrated in FIG. 6B is thinner than a thickness D1 of the conventional housing 200 without the filter module as illustrated in FIG. 6A, by the fastening member 320.

In addition, when the filter module 300 is inserted into the filter module seat 230, an end of the pad module 100 is supported by the pad spring 120 so that excessive insertion may be prevented.

In addition, when the filter module 300 is fixed to the filter module seat 220 by the fastening member 320, for the smooth forward and backward movement of the brake pads

110, the filter module 300 may be provided to be spaced apart from the pad spring 120 at predetermined intervals.

Meanwhile, although not illustrated, a brake dust collector in accordance with another embodiment of the present disclosure may be provided with the filter module 300 in only one of the leading portion 201 or the trailing portion 202. Herein, since the typical air flow generated by the rotation of the disc D is induced from the leading portion 201 to the trailing portion 202, the filter module 300 may be more advantageously provided in the trailing portion 202 than in the leading portion 201.

In addition, as described above, when the filter module 300 is provided in the trailing portion 202, the filter module seat 220, the exposure groove 221, and the fastening member fastening hole 230, which are intended to fasten the filter module 300 to the housing 200, may be provided on a side of the trailing portion 202, and may be omitted on a side of the leading portion 201.

Accordingly, the brake dust collector in accordance with the present embodiment may further minimize stiffness degradation of the housing 200 caused by the filter module 300.

In addition, when the filter module 300 is fixed to the filter module seat 220 by the fastening member 320, for the smooth forward and backward movement of the brake pads 110, the filter module 300 may be provided to be spaced apart from the pad module 100 at predetermined intervals.

Accordingly, the brake dust collector in accordance with one embodiment of the present disclosure may add a dust collection function without significant change in design compared to a conventional monoblock caliper brake without a dust collection function, and thus may minimize stiffness degradation of the housing.

A brake dust collector in accordance with the present embodiment can effectively collect dust generated by friction between a disc and a brake pad and discharged to the outside of a housing.

A brake dust collector in accordance with the present embodiment can improve dust collection efficiency due to a filter module provided in each of a leading portion and a trailing portion.

A brake dust collector in accordance with the present embodiment can facilitate management of a filter module by enabling the filter module to be cleansed by washing liquid and the like even in a state in which the filter module is mounted on a housing.

A brake dust collector in accordance with the present embodiment can collect dust through a tangential air flow generated by rotation of a disc without a separate flow control element for dust induction.

A brake dust collector in accordance with the present embodiment can omit a device for dust collection separately from a housing and thus prevent decline of aesthetics.

A brake dust collector in accordance with the present embodiment can minimize stiffness degradation of a housing caused by a filter module inserted into the housing.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A brake dust collector assembly comprising:

a pad module including a pair of brake pads that are disposed on opposite sides of a disc rotating together with a wheel and are in close contact with or separated from the disc according to a forward and backward movement of a piston;

a housing provided to cover a part of the disc by forming a pad module seat provided between a leading portion and a trailing portion and to which the pad module is coupled, and filter module seats at inner sides of the leading portion and the trailing portion, respectively; and each of the filter modules fixed to a corresponding one of the filter module seats by a fastening member that penetrates and fastens from one side to the other side of the housing, wherein each of the filter modules comprises:

fastening member through holes, which are penetrated by the corresponding fastening members; and each of the filter modules is fixed to a corresponding one of the filter module seats by the corresponding fastening member fastening through a fastening member fastening hole provided in the corresponding filter module seat and the fastening member through hole.

2. The brake dust collector assembly of claim 1, wherein the pad module further comprises:

pad springs provided between both ends of the brake pad and the pad module seat;

a shim pad provided between the brake pad and the piston; and guide pins provided in guide holes formed at both sides of an upper portion of the brake pad and configured to guide the forward and backward movement of the brake pad.

3. The brake dust collector assembly of claim 2, wherein each of the pad springs comprises:

a guide pin locking portion provided in an upper center part and locked to a center part of the guide pin;

a housing locking portion provided at an upper end and locked to the housing; and pad supports provided on both sides of a lower end of the brake pad and configured to support each side of the lower end of the brake pad.

4. The brake dust collector assembly of claim 1, wherein the housing further comprises:

pad module exposure portions provided on both ends of the pad module seat to penetrate upwards; and a pad spring support provided at each of the pad module exposure portions and configured to seat the housing locking portion.

5. The brake dust collector assembly of claim 2, wherein the shim pad is fastened to the brake pad.

6. The brake dust collector assembly of claim 2, wherein each of the guide pins comprises:

a fixing member fastening hole provided at a head side; and a fixing member inserted into the fixing member fastening hole to prevent the guide pin from being separated from the housing and the brake pad; and each of the guide pins is coupled through a guide pin fastening hole provided in the pad module seat and the guide hole.

7. The brake dust collector assembly of claim 2, wherein each of the filter modules is fixed to a corresponding filter module seat, and an end of the pad module is spaced at a predetermined interval from a corresponding pad spring.

8. The brake dust collector assembly of claim 2, wherein each of the filter modules is fixed to a corresponding filter module seat, and an end of the pad module is supported by a corresponding pad spring.

9. The brake dust collector assembly of claim 1, wherein the piston is installed in a piston insertion portion provided on the pad module seat.

10. The brake dust collector assembly of claim 1, wherein the housing further comprises an exposure groove provided at an end of each of the leading portion and the trailing portion so that one end of the filter module is partially exposed.

11. The brake dust collector assembly of claim 1, wherein each of the fastening members is provided with:

a bolt penetrating the fastening member fastening hole on one side; and a nut fastened to the bolt exposed to the fastening member fastening hole on the other side.

12. The brake dust collector assembly of claim 1, wherein each of the filter modules comprises a filter made of metal with corrosion resistance and heat resistance.

13. The brake dust collector assembly of claim 1, wherein the housing is provided as a monoblock further including one or more heat dissipation holes that are provided as a heat exhaust passage and a fluid flow passage in the leading portion and the trailing portion.

14. A brake dust collector assembly comprising:

a pad module including a pair of brake pads that are disposed on opposite sides of a disc rotating together with a wheel and are in close contact with or separated from the disc according to a forward and backward movement of a piston;

a housing provided to cover a part of the disc by forming a pad module seat provided between a leading portion and a trailing portion and to which the pad module is coupled, and a filter module seat at an inner side of the trailing portion; and a filter module fixed to the filter module seat by a fastening member penetrating and fastening from one side to the other side of the housing through a fastening member fastening hole provided in the filter module seat, wherein the filter module comprises:

a fastening member through hole penetrated by the fastening member; and the filter module is fixed to the filter module seat by the fastening member fastening through a fastening member fastening hole provided in the filter module seat and the fastening member through hole.

15. The brake dust collector assembly of claim 14, wherein the housing further comprises an exposure groove provided at an end of the trailing portion so that one end of the filter module is partially exposed.

16. The brake dust collector assembly of claim 14, wherein the housing is provided as a monoblock further including at least one or more heat dissipation holes that are provided as a heat exhaust passage and a fluid flow passage on the filter module seat.

17. The brake dust collector assembly of claim 14, wherein the filter module comprises a filter made of metal with corrosion resistance and heat resistance.

18. The brake dust collector assembly of claim 14, wherein the fastening member is provided with:

a bolt penetrating the fastening member fastening hole on one side; and a nut fastened to the bolt exposed to the fastening member fastening hole on the other side.

19. The brake dust collector assembly of claim 14, wherein the filter module is fixed to the filter module seat at a predetermined interval from the pad module.

* * * * *